United States Patent [19]

Turnbo

[11] 3,963,671

[45] June 15, 1976

[54] FIRE-RETARDANT THERMOSETTING RESINOUS COMPOSITIONS

[75] Inventor: Roy G. Turnbo, Deer Park, Tex.

[73] Assignee: Tenneco Chemicals, Inc., Saddle Brook, N.J.

[22] Filed: Aug. 28, 1974

[21] Appl. No.: 501,348

[52] U.S. Cl. ................. 260/45.7 R; 260/45.75 R
[51] Int. Cl.² ................................. C08K 1/00
[58] Field of Search ............ 260/45.7 R, 23.7 R, 260/23 R, 2.5 EP

[56] References Cited
UNITED STATES PATENTS
3,093,599   6/1963   Mueller-Tamm .............. 260/45.7 R

OTHER PUBLICATIONS

Lyons, "The Chemistry & Uses of Fire Retardants," 1900, (pp. 370, 391, 392, 393, 406 and 411 relied on.

Primary Examiner—Donald E. Czaja
Assistant Examiner—William E. Parker
Attorney, Agent, or Firm—Evelyn Berlow

[57] ABSTRACT

Hexabromobutadiene is used to impart fire-retardance to epoxy resins, polyesters, and other thermosetting organic resins that are normally susceptible to burning.

5 Claims, No Drawings

FIRE-RETARDANT THERMOSETTING RESINOUS COMPOSITIONS

This invention relates to fire-retardant resinous compositions. More particularly, it relates to thermosetting organic resin compositions that contain a fire-retarding amount of hexabromobutadiene.

Thermosetting organic resins are used in the manufacture of a broad range of consumer and industrial products including boats, car bodies, bathtubs, encapsulated electronic components, and laminated printed circuit boards. As ordinarily prepared, these resins are readily ignitable and flammable. Because of the fire hazard inherent in their use, it is necessary that compositions containing these resins be rendered fire-retardant. A number of materials, such as aluminum oxide, antimony oxide, and halogenated organic compounds, have been suggested as fire-retardants for organic resins, but none has proven to be entirely satisfactry in this application. While many of these compounds increase the fire-resistance of the resins, they usually have an adverse effect on the properties of the resins when they are used in amounts sufficient to impart to them the desired degree of fire-retardance. In addition, many of the halogenated compounds are volatile or unstable, and compositions containing them lose their fire-retardance with the passage of time.

In accordance with this invention, it has been found that hexabromobutadiene imparts fire-resistance to thermosetting organic resinous compositions without adversely affecting their physical properties.

Hexabromobutadiene, which has the structural formula

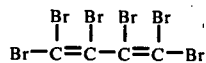

has a combination of properties that makes it particularly valuable as a fire-retardant for thermosetting organic resinous compositions. It is a white solid compound that melts at 60°C. and that contains about 90 percent by weight of bromine. It has good solubility in the resins and thus can be used in the production of transparent castings. Because it is non-volatile, stable, and insoluble in water, hexabromobutadiene cannot be separated by leaching, washing, or evaporation. In addition, hexabromobutadiene is not-toxic, non-irritating, and biodegradable.

Hexabromobutadiene can be prepared easily and in good yield by the bromination of diacetylene. This reaction may be conveniently and safely carried out by contacting a gas stream that contains about 20 to 40 mole percent of diacetylene in an inert gas, such as nitrogen, with an aqueous solution of sodium hypobromite at 0°C. The dibromodiacetylene formed is extracted from the aqueous solution with an inert water-immiscible organic solvent, such as carbon tetrachloride. It is then separated from the organic solvent and brominated to hexabromobutadiene.

Hexabromobutadiene can be used to impart fire-retardance to a wide variety of normally-flammable thermosetting organic resins including epoxy resins, polyesters, phenol-aldehyde resins, aminoaldehyde resins, and mixtures of these resins. It is of particular value as the fire retardant in compositions that contain epoxy resins or polyesters. Because it is non-reactive, it can be added to any system without changing the formulation.

The epoxyresins in which hexabromobutadiene can be used as the fire-retardant are polyethers resulting from the condensation of a halogen-containing epoxide, such as epichlorohydrin, with a polyhydric phenol or a polyhydric alcohol. They may be saturated or unsaturated, aliphatic, cycloaliphatic, aromatic, or heterocyclic; they may be substituted with chlorine or bromine atoms, hydroxyl groups, or amine groups. The epoxy resins generally have epoxide equivalent weights in the range of 170 to 250 and average molecular weights in the range of 200 to 2000; they preferably have epoxide equivalent weights in the range of 175 to 210 and average molecular weights in the range of 350 to 600.

The epoxy resins that are polyethers of polyhydric phenols may be prepared by reacting a phenol, such as catechol, resorcinol, 2,2-bis(4-hydroxyphenyl)propane, 2,2-bis(4-hydroxyphenyl)butane, or 4,4'-dihydroxybiphenyl, with epichlorohydrin in an alkaline medium at a temperature between 50°C. and 150°C. The epoxy resins that are polyethers of polyhydric alcohols may be prepared by reacting an alcohol, such as ethylene glycol, neopentyl glycol, glycerol, trimethylolethane, trimethylolpropane, or pentaerythritol, with epichlorohydrin in the presence of an acidic material, such as boron trifluoride, and subsequently treating the resulting polymer with an alkaline material. For most applications, the preferred epoxy resins are those prepared by the reaction of epichlorohydrin with bisphenol A[bis(4-hydroxyphenyl)dimethylmethane].

Conventional curing agents, for example, polyfunctional amines, phenols, acids, and anhydrides, are added to the epoxy resin, and the resulting compositions are cured by known techniques. Among the preferred curing agents are methylene dianiline and triethylenetetramine.

Thermosetting polyester resins that are flame retardant and that have high resistance to heat are of considerable commercial importance. Such resins are required, for example, in the production of moldings, castings, and laminated structures that are to be used in the manufacture of electrical components or in many applications by the boating industry. These resins, which are ethylenically-unsaturated, cross-linkable polyesters, are generally the products of the condensation of an α,β-ethylenically-unsaturated dicarboxylic acid with a polyhydric alcohol, and optionally a dicarboxylic acid that is free of ethylenic unsaturation. These unsaturated polyesters may be cross-linked using a peroxide catalyst in the presence or absence of a cross-linking agent, such as styrene, methyl methacrylate, or allyl acetate.

Among the α,β-ethylenically-unsaturated dicarboxylic acids that can be used in the preparation of the unsaturated polyesters are maleic acid, fumaric acid, itaconic acid, aconitic acid, and citraconic acid, and mixtures thereof. The useful polyhydric alcohols include ethylene glycol, diethylene glycol, polyethylene glycol, propylene glycol, glycerol, neopentyl glycol, trimethylolethane, trimethylolpropane, pentaerythritol, and mixtures thereof. The saturated dicarboxylic acid may be an aliphatic acid, such as adipic acid, succinic acid, or azelaic acid, or an aromatic acid, such as phthalic acid of terephthalic acid. The peroxide catalyst that is used to effect setting or curing of the polyester resin may be, for example, benzoyl peroxide, acetyl peroxide, or methyl ethyl ketone peroxide. In addition, the polyester resin usually contains an accelerator that is a metallic salt, such as cobalt naphthenate or manganese naphthenate; and aniline, such as dimethylaniline or diethylaniline; a mercaptan, such as dodecylmercaptan or mercaptoethanol, or a quaternary amine. It may also contain such additives as inhibitors, chain transfer agents, waxes, and the like.

Phenol-formaldehyde resins can also be rendered fire-retardant by incorporating hexabromobutadiene into them. These resins are prepared by the reaction of a phenol, such as phenol, cresol, xylenol, resorcinol, 4-butylphenol, or 4-phenylphenol, with an aldehyde, such as formaldehyde, acetaldehyde, or butyraldehyde.

Amino-aldehyde resins comprise another group of thermo-setting organic resins that can be used in the compositions of this invention. These include the heat-convertible condensation products of formaldehyde or another aldehyde with urea, thiourea, guanidine, cyanamide, dicyandiamide, melamine, 2-chloro-4,6-diamino-1,3,5-triazine, or 2-hydroxy-4,6-diamino-1,3,5-triazine.

Hexabromobutadiene can be incorporated into the resinous compositions by any convenient procedure. For example, it can be dissolved in the resin prior to the addition of the curing agent. Alternatively, it can be added to a mixture of the resin, curing agent, and other components of the compositions before the final curing step.

The amount of hexabromobutadiene that is incorporated in the resinous compositions is that which will impart the desired degree of fire-retardance to the compositions without adversely affecting their physical properties. The addition of as little as 0.2 part of hexabromobutadiene, based on the weight of the resin in the composition, results in a significantly reduced burn rate. In some compositions, 50 percent or more of hexabromobutadiene, based on the weight of the resin in the composition, can be used to achieve maximum fire-retardance without harming the properties of the composition. It is generally preferred that from 5 percent to 30 percent of hexabromobutadiene, based on the weight of the resin, be used in thermosetting organic resinous compositions.

Because of its effectiveness as a fire-retardant, hexabromobutadiene is in most cases used without a synergist. If desired, however, small amounts of antimony trioxide or another synergist can be used in combination with the hexabromobutadiene.

In addition to the thermosetting organic resin and hexabromobutadiene, the fire-retardant compositions of this invention may contain such additives as fillers, pigments, dyes, antioxidants, and the like in the amounts ordinarily used for these purposes.

The invention is further illustrated by the following examples.

EXAMPLE 1

Hexabromobutadiene was evaluated as a fire-retardant in a commercial epoxy resin that is marketed as Epon R-828 by Shell Chemical Corp. This resin, which is the reaction product of epichlrorohydrin and bisphenol A, has a epoxide equivalent weight of 185 to 205, a viscosity of 5,000 to 15,000 cp at 25°C., and an average molecular weight of 250 to 400. The following procedure was added:

To 17 grams of the uncured epoxy resin, which had been heated to 80°C., was added 4.8 grams of methylene dianiline. The mixture was stirred at 80°C. until a clear solution was obtained. To this solution was added with stirring 2.2 grams (10 PHR) of hexabromobutadiene. A 5.0 gram sample of the mixture was poured into a 9 cm.-diameter dish and cured at 90°C. for 24 hours. To the remainder of the epoxy resin was added an additional 1.6 grams of hexabromobutadiene to bring its content of hexabromobutadiene to 20 PHR. A 5 gram sample of this mixture was poured into a 9 cm.-diameter dish and cured at 90°C. for 24 hours. For comparative purposes, compositions were prepared that contained no flame-retardant, that contained 10 PHR of antimony trioxide, and that contained 10 PHR of antimony trioxide and 20 PHR of hexabromobutadiene. Strips (1.5 × 10 × 40 mm.) were cut from the cured castings and tested by the procedure described in ASTM Method D-2863-70. The Limiting Oxygen Indexes (LOI) of the compositions are given in Table I.

Table I

| Casting No. | Additive | | LOI |
|---|---|---|---|
| 1A | 30 PHR* | HBBD** | >37.8 |
| 1B | 20 PHR | HBBD | 27 |
| 1C | 5 PHR | | 26.6 |
| 1D | None | | 21 |
| 1E | 20 PHR | HBBD and | 27.5 |
|    | 10 PHR | $Sb_2O_3$ | |
| 1F | 10 PHR | $Sb_2O_3$ | 23.5 |

*PHR = Parts by weight per 100 parts of resin
**HBBD = Hexabromobutadiene

From the data in Table I, it will be seen that as little as 5 PHR of hexabromobutadiene imparted appreciable flame-retardance to the epoxy resin composition. The addition of antimony oxide to the composition containing hexabromobutadiene had very little effect on the LOI of the composition.

EXAMPLE 2

Hexabromobutadiene was evaluated as a fire-retardant in a commercial epoxy resin that is marketed as Epon 815 by Shell Chemical Corp. This resin has an epoxide equivalent weight of 175 to 210, a viscosity of 500 to 900 cp. at 25°C., and an average molecular weight of 340–400.

The compositions, which contained 0, 5 PHR, 10 PHR or 20 PHR of hexabromobutadiene, were prepared and evaluated by the procedures described in Example 1. The results obtained are given in Table II.

Table II

| Casting No. | Hexabromobutadiene PHR | LOI |
|---|---|---|
| 2A | 20 | 33.3 |
| 2B | 10 | 31.7 |
| 2C | 5 | 27.9 |
| 2D | 0 | 22.0 |

EXAMPLE 3

Hexabromobutadiene was evaluated as a flame-retardant in an unsaturated, wax-filled, cobalt-promoted, phthalic anhydridemaleic anhydride-propylene glycol polyester that contained about 25% of styrene.

This polyester is marketed as Aropol 74-31-T16 by Ashland Chemical Co.

To 16 grams of the unsaturated polyester resin was added with stirring 8 drops of methyl ethyl ketone peroxide and either 0, 5 PHR, 10 PHR, or 20 PHR of hexabromobutadiene. Samples of the mixtures were poured into a 9 cm.-diameter mold and cured for 24 hours. The Limited Oxygen Indexes of strips cut from the centers of the castings were determined. The results obtained are given in Table III.

Table III

| Casting No. | Hexabromobutadiene PHR | LOI |
|---|---|---|
| 3A | 30 | 28.5 |
| 3B | 20 | 27.2 |
| 3C | 10 | 23.2 |
| 3D | 0 | 20.0 |

What is claimed is:

1. A fire-retardant composition that comprises a thermosetting organic resin selected from the group consisting of epoxy resins, polyesters, phenolic resins, amino-aldehyde resins, and mixtures thereof and a fire-retarding amount of hexabromobutadiene.

2. A fire-retardant resinous composition as defined in claim 1 that contains from 0.2 percent to 50 percent, based on the weight of the resin, of hexabromobutadiene.

3. A fire-retardant resinous composition as defined in claim 1 that contains from 5 percent to 30 percent, based on the weight of the resin, of hexabromobutadiene.

4. A fire-retardant resinous composition as defined in claim 1 wherein the thermosetting organic resin is an epoxy resin.

5. A fire-retardant resinous composition as defined in claim 1 wherein the thermosetting organic resin is an ethylenically-unsaturated, cross-linkable polyester resin.

* * * * *